(12) United States Patent
In et al.

(10) Patent No.: US 11,050,123 B2
(45) Date of Patent: Jun. 29, 2021

(54) BATTERY MODULE

(71) Applicant: HONDA MOTOR CO., LTD., Tokyo (JP)

(72) Inventors: Kazuhisa In, Saitama (JP); Hiroki Itaya, Saitama (JP); Atsushi Nakano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 126 days.

(21) Appl. No.: 16/431,983

(22) Filed: Jun. 5, 2019

(65) Prior Publication Data
US 2019/0393470 A1    Dec. 26, 2019

(30) Foreign Application Priority Data

Jun. 22, 2018  (JP) .............................. JP2018-119102

(51) Int. Cl.
*H01M 50/502*    (2021.01)
*H01M 10/48*    (2006.01)
*H01M 50/20*    (2021.01)

(52) U.S. Cl.
CPC ....... *H01M 50/502* (2021.01); *H01M 10/482* (2013.01); *H01M 50/20* (2021.01); *H01M 2220/20* (2013.01)

(58) Field of Classification Search
None
See application file for complete search history.

(56) References Cited

FOREIGN PATENT DOCUMENTS

JP    2016-072181 A    5/2016

OTHER PUBLICATIONS

Machine Translation of JP2016-072181 to Hideki (Year: 2016).*

* cited by examiner

*Primary Examiner* — Wyatt P McConnell
(74) *Attorney, Agent, or Firm* — Paratas Law Group, PLLC (57) ABSTRACT

A battery module includes: a cell-stacked body constituted by stacking a plurality of cells; a plurality of bus bars, each of which connects terminals of adjacent cells; and a sensor device configured to detect a voltage of each cell. The sensor device is disposed above the plurality of bus bars disposed on an upper surface of the cell-stacked body as viewed from a width direction perpendicular to a stacking direction and an up-down direction, and includes a connector having a connection portion in the width direction. Each of the bus bars has a bent portion protruding upward between the cells to be connected. The connector is disposed between the bent portions of adjacent bus bars in the stacking direction, and a lower surface of the connector is provided at a position lower than an upper portion of the bent portion in the up-down direction.

4 Claims, 7 Drawing Sheets

BATTERY MODULE

CROSS-REFERENCE TO RELATED APPLICATION (S)

This application claims priority from Japanese Patent Application No. 2018-119102 filed on Jun. 22, 2018, the entire contents of which are incorporated herein by reference.

FIELD

The present invention relates to a battery module mounted on an electric vehicle or the like.

BACKGROUND

In a related art, a battery module is mounted in an electric vehicle and the like. For example, JP-A-2016-072181 discloses a battery module including a cell-stacked body constituted by stacking a plurality of cells and a sensor device which detects the voltage of each cell.

However, in a case of the battery module in which the sensor device is disposed on an upper surface of the cell-stacked body as in JP-A-2016-072181, there is a concern that a height dimension may significantly increase. Particularly, in a case of a battery module to which a bus bar having a bent portion protruding upward in a middle portion of a cell stacking direction is applied in order to relieve stress acting as the cell expands, not only the height dimension may increase significantly, but also the insertion and removal of a connector connected to the sensor device may be hindered by the bent portion of the bus bar.

SUMMARY

The invention provides a battery module capable of suppressing a height dimension and securing an insertion and removal space of a connector while a sensor device is disposed on an upper surface of a cell-stacked body.

A battery module according to the invention includes:

a cell-stacked body constituted by stacking a plurality of cells, a plurality of bus bars, each of which connects terminals of adjacent cells, and a sensor device configured to detect a voltage of each cell, wherein the sensor device is disposed above the plurality of bus bars disposed on an upper surface of the cell-stacked body as viewed from a width direction perpendicular to a stacking direction and an up-down direction, and includes a connector having a connection portion in the width direction, each of the bus bars has a bent portion protruding upward between the cells to be connected, and the connector is disposed between the bent portions of adjacent bus bars in the stacking direction, and the lower surface of the connector is provided at a position lower than an upper portion of the bent portion in the up-down direction.

According to the invention, since the connector of the sensor device is disposed between the bent portions of adjacent bus bars in the stacking direction and the lower surface of the connector is provided at a position lower than the upper portion of the bent portion in the up-down direction, the height dimension can be reduced While securing the insertion and removal space of the connector in the battery module in which the sensor device is placed on the upper surface of the cell-stacked body.

DETAILED DESCRIPTION

Hereinafter, an embodiment of a battery module of the invention will be described based on the accompanying drawings. The drawings should be viewed in the direction of reference signs.

[Battery Module]

Figure 1:
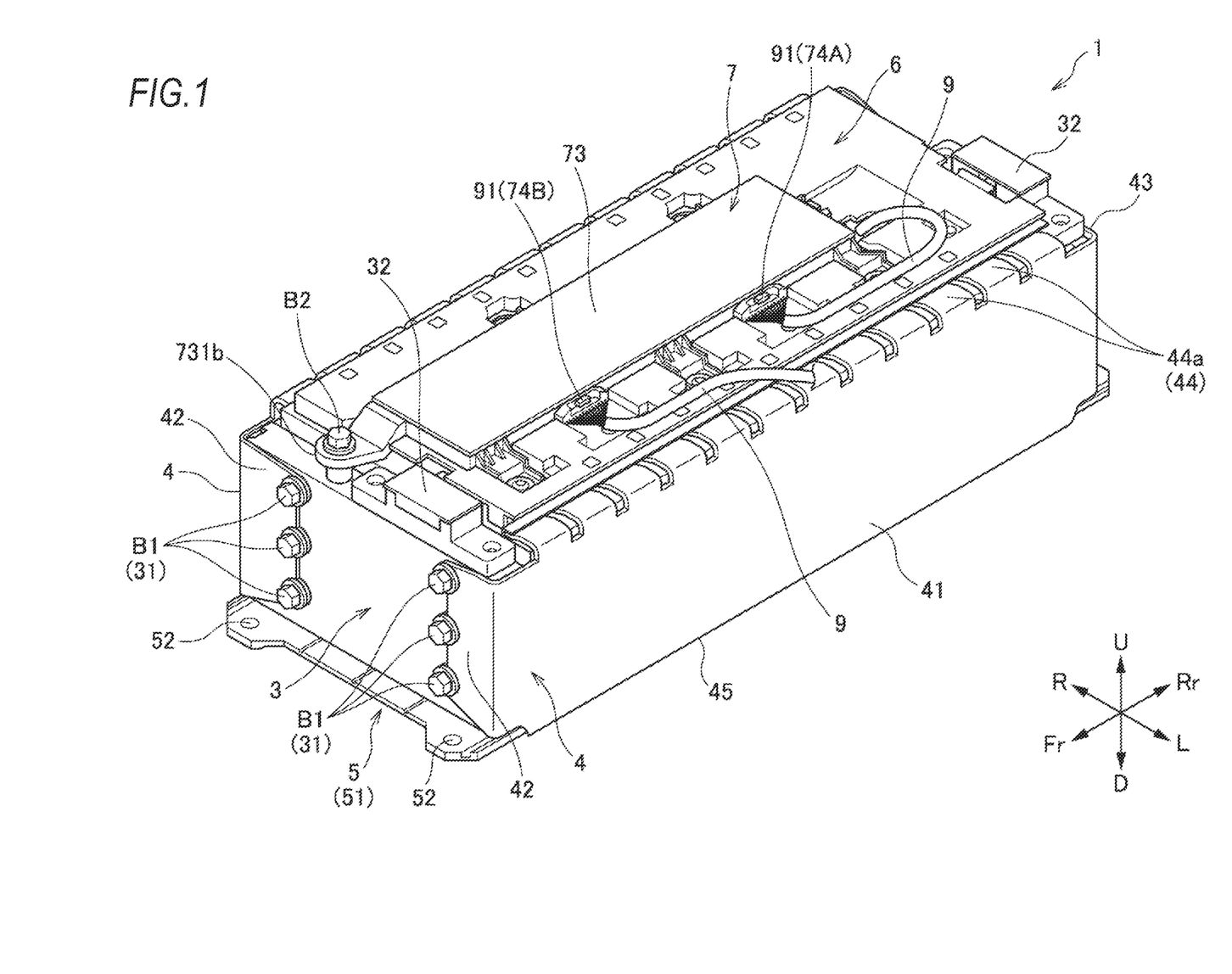
FIG. 1 is a perspective view of a battery module according to an embodiment of the invention as viewed obliquely from above.
Figure 2:
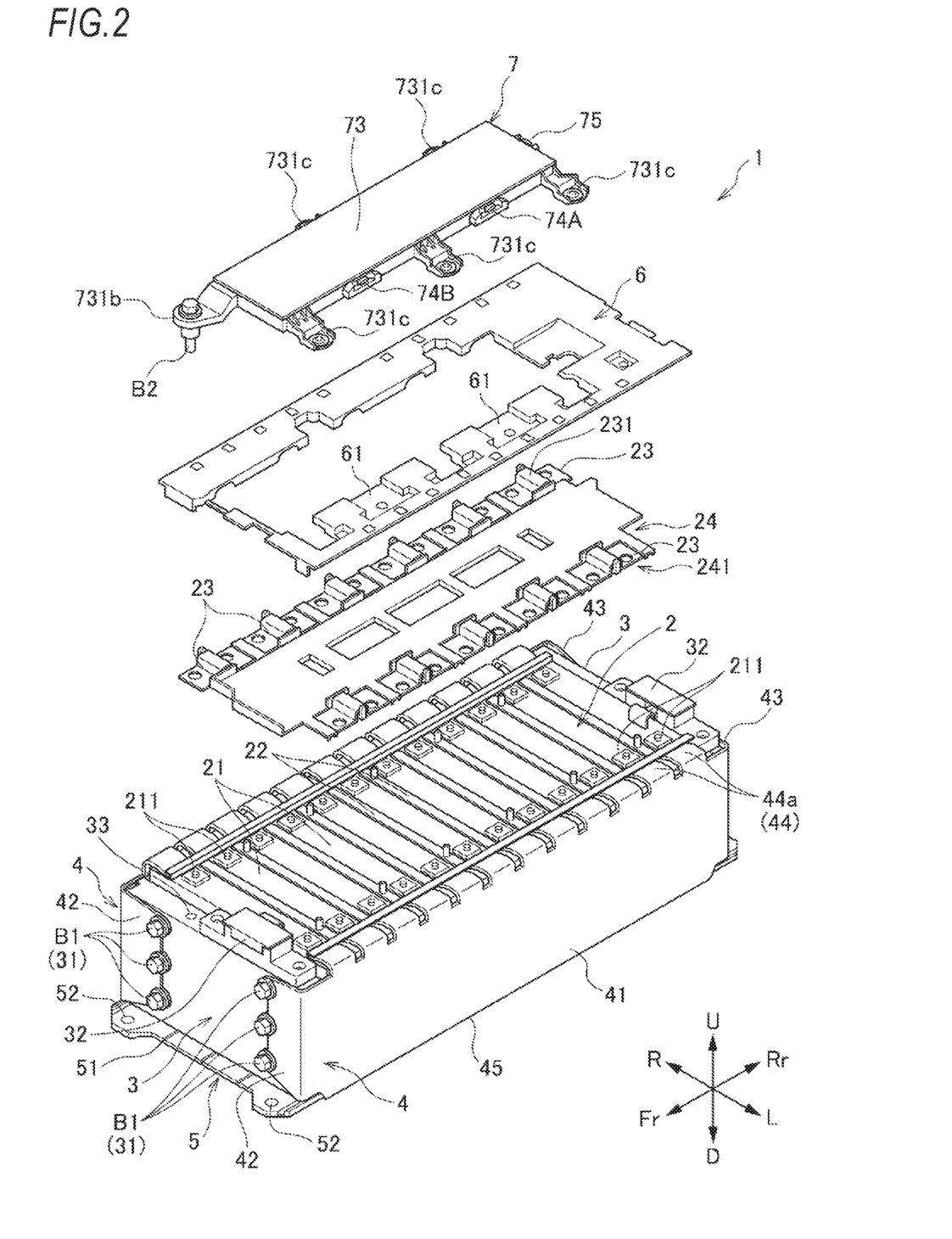
FIG. 2 is an exploded perspective view of the battery module of FIG. 1.
Figure 3:
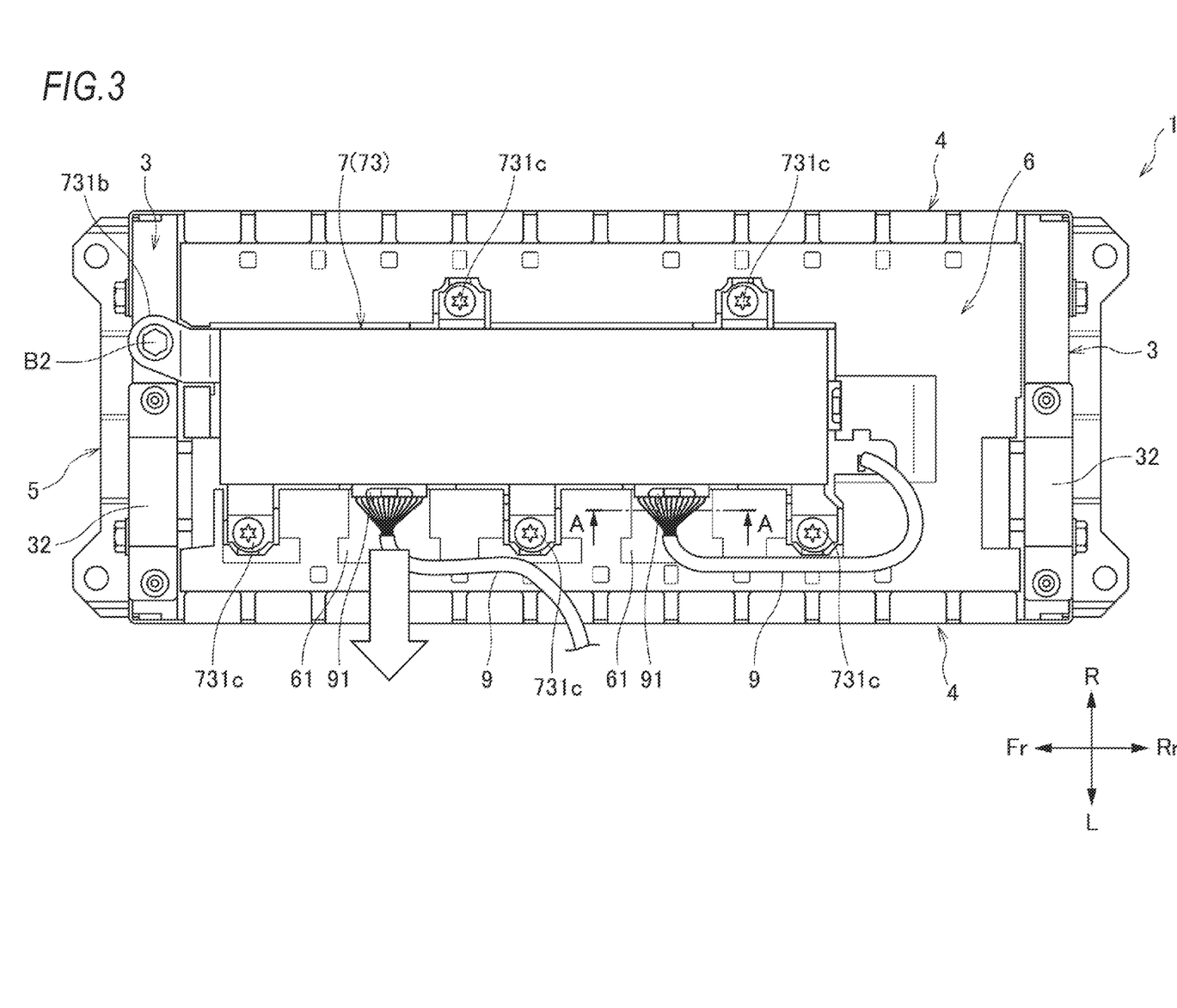
FIG. 3 is a plan view of the battery module of FIG. 1.

As illustrated in FIGS. 1 to 3, a battery module 1 according to the embodiment includes a cell-stacked body 2 configured by stacking a plurality of cells 21 in a front-rear direction and having a front surface, a rear surface, a left surface, a right surface, an upper surface, and a lower surface; a pair of end plates 3 disposed on the front surface and the rear surface of the cell-stacked body 2; a pair of side frames 4 disposed on the left surface and the right surface of the cell-stacked body 2 and connecting the pair of end plates 3; a lower plate 5 disposed under the lower surface of the cell-stacked body 2; a sensor device 7 disposed on the upper surface of the cell-stacked body 2 for detecting the voltage of each cell 21; and a top cover 6 covering a region of the top surface of the cell-stacked body 2 on which the sensor device 7 is not mounted.

In this description and the like, in order to simplify and clarify the description, a stacking direction of the cells 21 is defined as a front-rear direction and directions perpendicular to the stacking direction of the cells 21 are defined as a right-left direction (width direction) and an up-down direction (height direction) and those directions are irrelevant to the front-rear direction and the like of a product on which the battery module 1 is mounted. That is, when the battery module 1 is mounted on a vehicle, the stacking direction of the cells 21 may match the front-rear direction of the vehicle, or may be the up-down direction or the right-left direction of a vehicle, or may be a direction inclined from those directions. In the drawings, the front of the battery module 1 is indicated as Fr, the rear is indicated as Rr, the left side is indicated as L, the right side is indicated as R, the upper side is indicated as U, and the lower side is indicated as D.

[Cell-Stacked Body]

As illustrated in FIG. 2, the cell-stacked body 2 is constituted by alternately stacking a plurality of cells 21 and a plurality of insulation plates 22 in the front-rear direction. A plurality of bus bars 23 electrically connected to terminals 211 of the cells 21 are disposed on the upper surface of the cell-stacked body 2. The plurality of bus bars 23 connect the terminals 211 of the adjacent cells 21 so that the plurality of cells 21 are electrically connected in series. Specifically, the plurality of cells 21 are stacked such that the terminal 211 on a positive side and the terminal 211 on a negative side are sequentially reversed horizontally, and the plurality of bus bars 23 sequentially connect the terminals 211 on the positive side (or negative side) of the cell 21 adjacent to an upper side in the cell stacking direction and the terminals 211 on the negative side (or positive side) of the cell 21 adjacent to a lower side in the cell stacking direction. Accordingly, the plurality of bus bars 23 electrically connect the plurality of cells 21 in series.

A bus bar plate 24 for holding the plurality of bus bars 23 is provided on the upper surface of the cell-stacked body 2. The bus bar plate 24 includes a plurality of bus bar holders 241. When the bus bar plate 24 is placed on the upper surface of the cell-stacked body 2 after holding the plurality of bus bars 22 in the bus bar holders 241, the plurality of bus bars 23 are positioned at predetermined locations connectable to the corresponding terminals 211. Also, the bus bar plate 24 of the embodiment is not a jig which is detached after connecting the bus bars 23 to the terminals 211, but a constituent element of the battery module 1, which maintains a mounted state thereof even after connecting the bus bars 23 to the terminals 211.

The cell 21 is known to expand due to temperature variation and aged deterioration. The cell 21 has a rectangular shape in which the length in the up-down direction is longer than that in the front-rear direction and the length in the right-left direction is longer than that in the up-down direction. Therefore, the areas of the front and rear surfaces of the cell 21 are much larger than the areas of the left, right, upper, and lower surfaces, and thus the central portion in the right-left direction and the central portion in the up-down direction of the front and rear surfaces of the cell 21 easily expand. When the cell 21 expands in the front-rear direction, stress acts on the bus bar 23 connecting the terminals 211 of the cells 21 to each other. The bus bar 23 of the embodiment has a bent portion 231 protruding upward at the middle portion in the front-rear direction in order to relieve the stress acting as the cell 21 expands.

[End Plate]

As illustrated in FIGS. 1 to 3, the pair of end plates 3 are arranged along the front surface and the rear surface of the cell-stacked body 2 and receive a load of the cell-stacked body 2 in the cell stacking direction due to the expansion of the cell 21. The end plate 3 of the embodiment is formed using an aluminum extrusion material and a plurality of fastening portions 31 to be fastened to side frames 4 with bolts 131 are provided at the left and right end portions of an outer surface not facing the cell-stacked body 2. In addition, on the upper surface of the pair of end plates 3, there are provided external connection terminal bases 32 for transferring and receiving power between the battery module 1 and an external electric device, and further a sensor fixing portion 33 to which the sensor device 7 is fixed via a bolt B2 is provided on the upper surface of one of the end plates 3.

[Side Frame]

As illustrated in FIGS. 1 to 3, side frames 4 are formed by pressing a metal plate material and includes side frame main bodies 41 along the left or right surface of the cell-stacked body 2, front flange portions 42 extending from front ends of the side frame main bodies 41 in a direction approaching each other along the front surface of the end plate 3 on the front side, rear flange portions 43 extending from rear ends of the side frame main bodies 41 in a direction approaching each other along the rear surface of the end plate 3 on the rear side, upper flange portions 44 extending from upper ends of the side frame main bodies 41 in a direction approaching each other along the upper surface of the cell-stacked body 2, and lower flange portions 45 extending from lower ends of the side frame main bodies 41 in a direction approaching each other along the lower surface of the cell-stacked body 2 (lower plate 5).

The front flange portions 42 and the rear flange portions 43 are fastened to the end plate 3 on the front side and the end plate 3 on the rear side through the bolts B1. Therefore, the pair of end plates 3 are connected via the pair of side frames 4. The pair of side frames 4 allow relative displacement in the front-rear direction of the end plates 3 when the load of the cell-stacked body 2 in the cell stacking direction increases. For example, the relative displacement of the end plates 3 in the front-rear direction is allowed by the deformation of the side frame main bodies 41 in the front-rear direction, the angle change of the side frame main bodies 41 and the front flange portions 42 or the rear flange portions 43, and the like.

The upper flange portions 44 and the lower flange portions 45 vertically pinch the cell-stacked body 2 and the lower plate 5 at the left end portion and the right end portion of the cell-stacked body 2. Therefore, the relative positional fluctuation of the cell-stacked body 2, the side frames 4, and the lower plate 5 in the up-down direction is reduced and the plurality of cells 21 constituting the cell-stacked body 2 can be aligned.

The upper flange portion 44 of the embodiment is constituted of a plurality of elastic pieces 44a aligned in the front-rear direction and the number and positions of the elastic pieces 44a correspond to the number and positions of the cells 21 stacked in the front-rear direction. As a result, the upper flange portion 44 can elastically hold the plurality of cells 21 individually with appropriate elasticity. The lower flange portion 45 is fixed to or engaged with the lower plate 5 via fastened portions (not illustrated).

[Lower Plate]

As illustrated in FIGS. 1 and 2, the lower plate 5 is formed using an aluminum extrusion material and includes a lower plate main body 51 extending along the lower surfaces of the cell-stacked body 2 and end plates 3, a plurality of fixing portions 52 to be fixed to a module support structure (not illustrated) supporting the battery module 1, and fastening portions (not illustrated) to which the lower flange portions 45 of the side frames 4 are fastened.

[Sensor Device]

Figure 4:
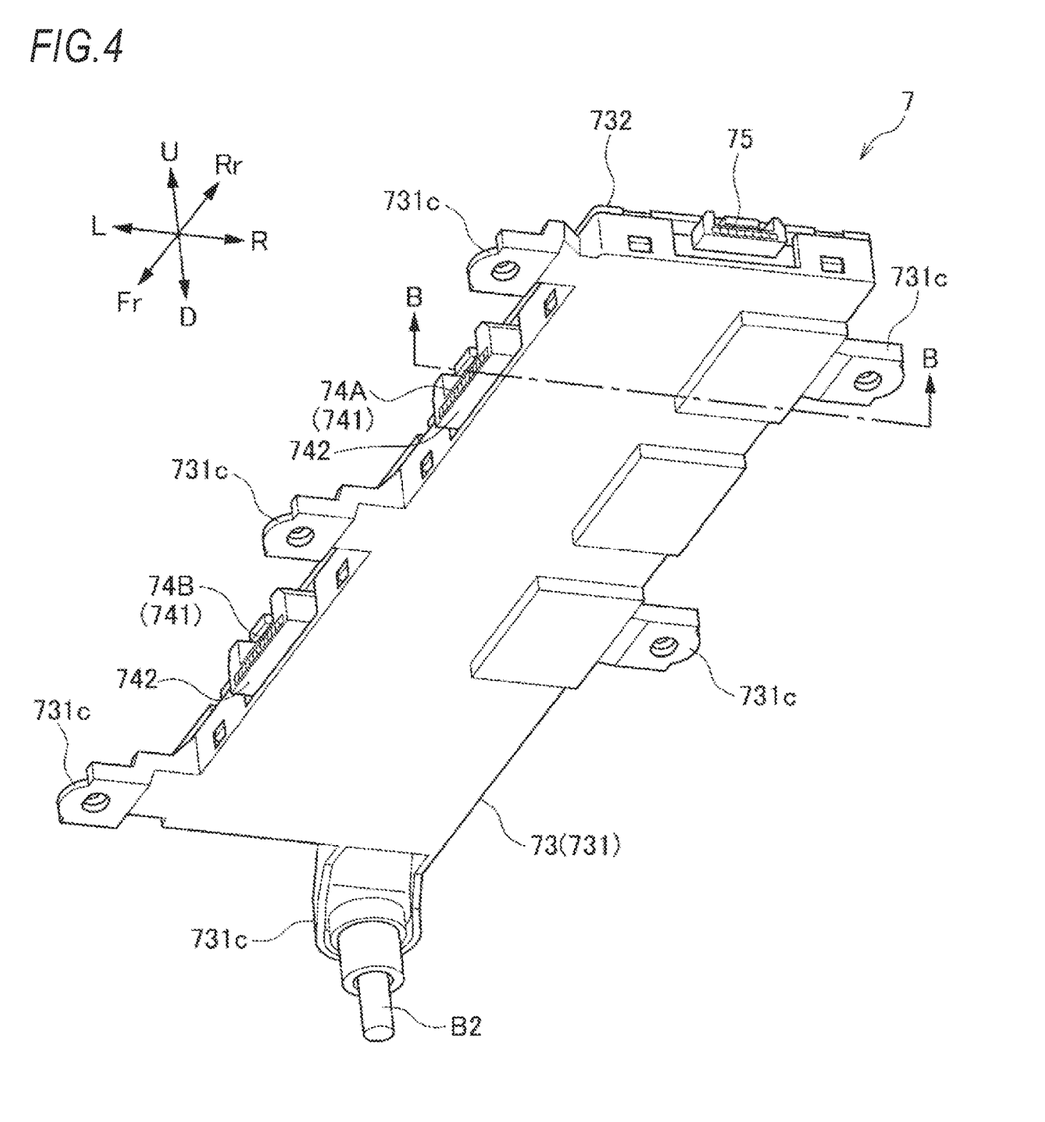
FIG. 4 is a perspective view of a sensor device of the battery module of FIG. 1 as viewed obliquely from below
Figure 5:
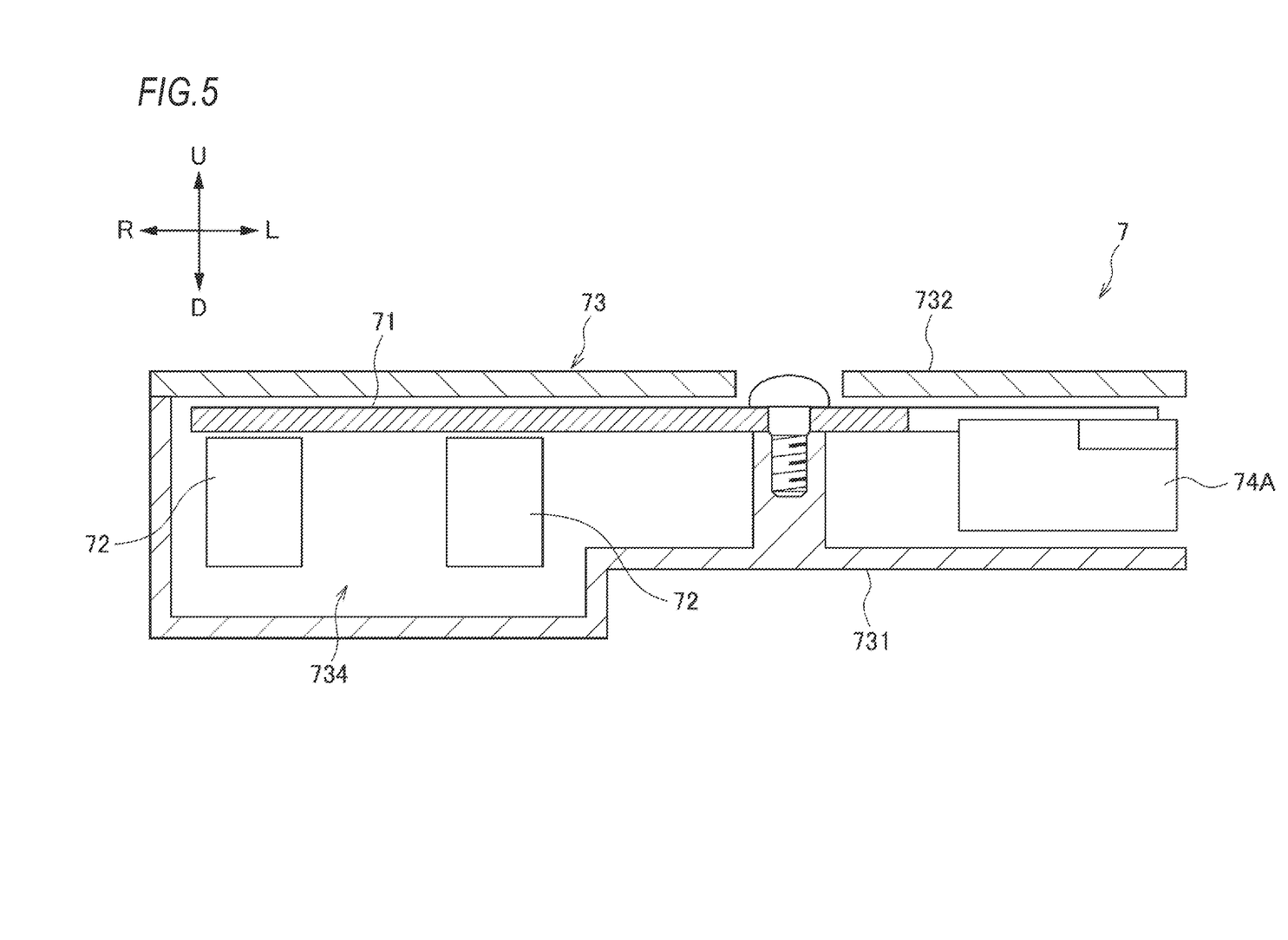
FIG. 5 is a cross-sectional view taken along the line B-B in FIG. 4.
Figure 7:
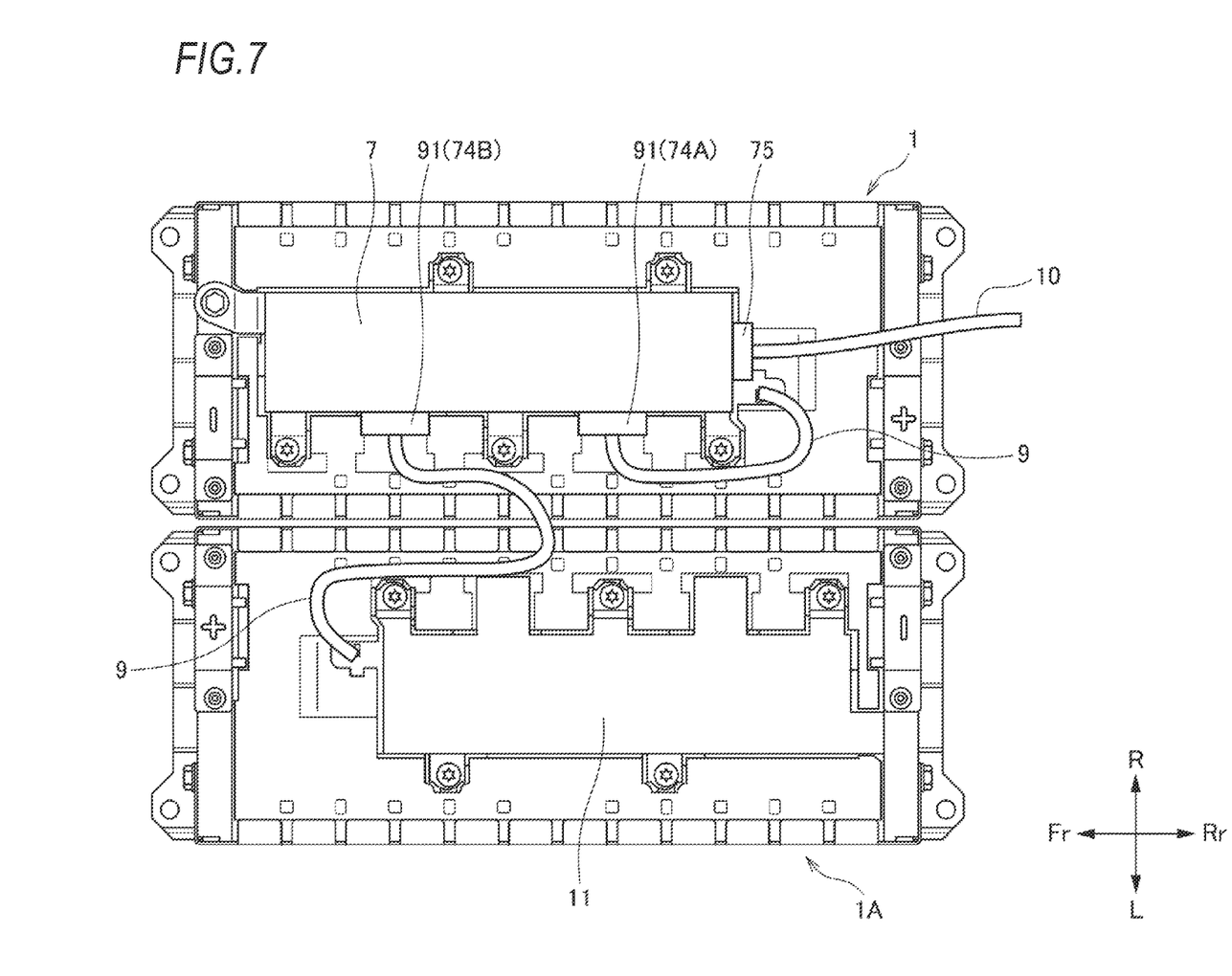
FIG. 7 is a plan view illustrating an example of wiring when two battery modules are arranged adjacent to each other.

As illustrated in FIGS. 4 and 5, the sensor device 7 includes a substrate 71, electronic components 72 mounted on the substrate 71, and a case 73 for accommodating the substrate 71 and the electronic components 72, voltage detection connectors 74A and 74B disposed on the side surface of the case 73, a detection signal output connector 75 disposed on the side surface of the case 73 and connected to a charge and discharge control unit (not illustrated) of a vehicle via a plurality of detection signal output lines 10 (see FIG. 7). Further, as described below, the sensor device 7 of the embodiment is provided with two voltage detection connectors 74A and 74B in order to enable to detect the voltages of two battery modules 1 and 1A. However, the number of voltage detection connectors may be one or three or more.

The substrate 71 in the embodiment is a print substrate having a rectangular shape in plan view which is long in the front-rear direction. In the substrate 71, the wiring is printed on the upper surface and the electronic components 72, the voltage detection connectors 74A and 74B, and the detection signal output connector 75 are mounted on the lower surface.

The case 73 includes a case main body 731 which covers the lower surface side of the substrate 71 and a lid case 732 which covers the upper surface side of the substrate 71. A fixing portion 731b to be fixed to the sensor fixing portion 33 of the end plate 3 via the bolt 132 is provided at one end portion of the case main body 731 in the front-rear direction and a plurality of engaging portions 731c to be engaged with the plurality of insulation plates 22 are respectively provided in the left and right side portions of the case main body 731.

The voltage detection connector 74A is connected to each bus bar 23 via a plurality of voltage detection lines 9. One end sides of the plurality of voltage detection lines 9 are connected to a cable-side connector 91 and are connected to the voltage detection connector 74A of the sensor device 7 through the cable-side connector 91. Further, the other end sides of the plurality of voltage detection lines 9 are connected to respective bus bars 23 via a space secured between the upper surface of the cell-stacked body 2 and the lower surface of the sensor device 7.

A connection portion 741 of the voltage detection connector 74A is disposed on the left side surface of the case 73 and the cable-side connector 91 is inserted or removed from the right-left direction. In the battery module 1 according to the embodiment of the invention, by arranging the sensor device 7 as low as possible while securing an insertion and removal space of the cable-side connector 91 for the connection portion 741 of the voltage detection connector 74A, the height dimension of the entire battery module 1 which combines the cell-stacked body 2 and the sensor device 7 is reduced.

Figure 6:
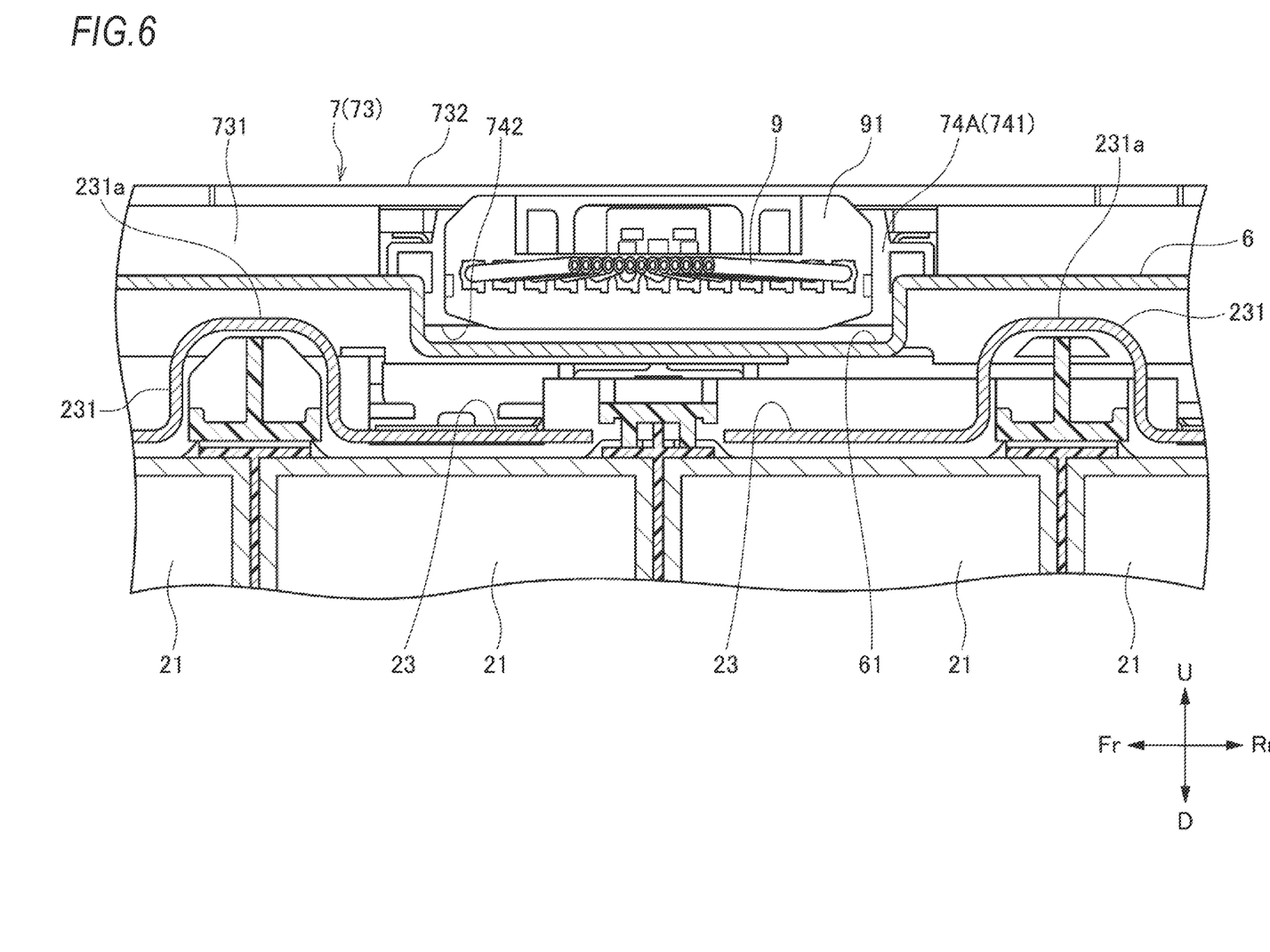
FIG. 6 is a cross-sectional view taken along the line A-A in FIG. 3.

Specifically, as illustrated in FIG. 6, although the sensor device 7 is disposed above the plurality of bus bars 23 disposed on the upper surface of the cell-stacked body 2 when viewed from the right-left direction, the voltage detection connector 74A (cable-side connector 91) is disposed between the bent portions 231 of adjacent bus bars 23 in the front-rear direction and a lower surface 742 of the voltage detection connector 74A (cable-side connector 91) is provided at a position lower than an upper portion 231a of the bent portion 231 in the up-down direction.

According to such a battery module 1, the sensor device 7 is disposed on the upper surface of the cell-stacked body 2, and also possible to control the height dimension while securing an insertion and removal space of the cable-side connector 91 with respect to the connection portion 741 of the voltage detection connector 74A. In addition, since the connection portion 741 of the voltage detection connector 74A is disposed on the side surface of the sensor device 7, the voltage detection connector 74A and the cable-side connector 91 can be prevented from protruding above the sensor device 7. In FIG. 6, a portion indicated by reference numerals 61 is a concave portion formed in a top cover 6 in order to secure a space for inserting or removing the cable-side connector 91 with respect to the connection portion 741 of the voltage detection connector 74A.

Also, the sensor device 7 of the embodiment includes two voltage detection connectors 744 and 74B. Therefore, as illustrated in FIG. 7, when another battery module 1A is arranged adjacent to the battery module 1, the voltage detection lines 9 connected to each bus bar 23 of the battery module 1 are connected to the voltage detection connector 74A and the voltage detection lines 9 connected to each bus bar (not illustrated) of another battery module 1A are connected to the voltage detection connector 74B. As a result, since the voltage of each cell (not illustrated) of another battery module 1A in addition to the battery module 1 can be detected by one sensor device 7, a sensor device is not necessary for another battery module 1A.

Further, when the voltage of each cell of another battery module 1A is detected by the sensor device 7 of the battery module 1, preferably, another battery module 1A is disposed adjacent to one side (left side in FIG. 7) of the battery module 1 in the right-left direction and, in the voltage detection connector 74B to which the voltage detection lines 9 of another battery module 1A are connected, the connection portion 741 is provided on the one side surface (left side surface in FIG. 7) of the sensor device 7 in the right-left direction. In this way, the voltage detection lines 9 of another battery module 1A connected to the voltage detection connector 74B can be shortened. In FIG. 7, a member indicated by reference numeral 11 is a cover member having substantially the same shape as the sensor device 7 in a plan view.

The voltage detection connector 74B (cable-side connector 91) is also disposed between the bent portions 231 of the bus bars 23 of the adjacent battery module 1 in front-rear direction and the lower surface 742 of the voltage detection connector 74B (cable-side connector 91) is provided at a position lower than the upper portion 231a of the bent portion 231 in the up-down direction. As a result, the height dimension can be reduced while securing the insertion and removal space of the cable-side connector 91 with respect to the connection portion 741 of the voltage detection connector 74B.

In the embodiment described above, modification, improvement, and the like can be appropriately made.

SUMMARY

At least the following matters are described in the description. In addition, the constituting components or the like corresponding in the embodiment described above are described in parenthesis, but are not limited thereto.

(1) A battery module (battery module 1) including:
a cell-stacked body (cell-stacked body 2) constituted by stacking a plurality of cells (cells 21),
a plurality of bus bars (bus bars 23), each of which connects terminals (terminals 211) of adjacent cells; and
a sensor device (sensor device 7) configured to detect a voltage of each cell, in which
the sensor device is disposed above the plurality of bus bars disposed on an upper surface of the cell-stacked body as viewed from a width direction perpendicular to a stacking direction and an up-down direction, and includes a connector (voltage detection connector 74A) having a connection portion (connection portion 741) in the width direction,
each of the bus bars has a bent portion (bent portion 231) protruding upward between the cells to be connected, and
the connector is disposed between the bent portions of adjacent bus bars in the stacking direction, and a lower surface (lower surface 742) of the connector is provided at a position lower than the upper portion (upper portion 231a) of the bent portion in the up-down direction.

According to (1), since the connector of the sensor device is disposed between the bent portions of adjacent bus bars in the stacking direction and the lower surface of the connector is provided at a position lower than the upper portion of the bent portion in the up-down direction, the height dimension can be reduced while securing an insertion and removal space of the connector in the battery module in which the sensor device is placed on the upper surface of the cell-stacked body.

(2) The battery module according to (1), in which
the sensor device includes:
a substrate (substrate 71),
an electronic component (electronic component 72) mounted on the substrate; and
a case (case 73) accommodating the substrate and the electronic component, and
the connector is provided on a side surface of the case.

According to (2), the height dimension can be reduced while protecting the substrate and the like by the case since the substrate and the electronic component are accommodated in the case.

(3) The battery module according to (1) or (2), in which
voltage detection lines (voltage detection lines 9) connected to each of the bus bars are connected to the connector.

According to (3), by connecting the voltage detection lines connected to each bus bar to the connector provided on the side surface of the case, the height dimension of the battery module can be reduced.

(4) The battery module according to (1) or (2), in which
the sensor device further includes another connector (voltage detection connector 74B) for connecting voltage detection lines (voltage detection lines 9) connected to each of bus bars of another battery module (another battery module 1A) disposed adjacent to one side in the width direction, and
a connection portion (connection portion 741) of the another connector is provided on the one side in the width direction.

According to (4), by connecting the voltage detection lines which are connected to each of bus bars of the another battery module disposed adjacent to the battery module in the width direction to the another connector of the battery module, a sensor device is not required to the another battery module. In addition, since the connection portion of the another connector is provided on another battery module side (one side in the width direction), the voltage detection lines connected to the connector can be shortened.

The invention claimed is:

1. A battery module, comprising:
a cell-stacked body constituted by stacking a plurality of cells;
a plurality of bus bars, each of which connects terminals of adjacent cells; and
a sensor device configured to detect a voltage of each cell, wherein
the sensor device is disposed above the plurality of bus bars disposed on an upper surface of the cell-stacked body as viewed from a width direction perpendicular to a stacking direction and an up-down direction, and includes a connector having a connection portion in the width direction,
each of the bus bars has a bent portion protruding upward between the cells to be connected, and
the connector is disposed between the bent portions of adjacent bus bars in the stacking direction, and a lower surface of the connector is provided at a position lower than an upper portion of the bent portion in the up-down direction.

2. The battery module according to claim 1, wherein
the sensor device includes:
a substrate;
an electronic component mounted on the substrate; and
a case accommodating the substrate and the electronic component, and
the connector is provided on a side surface of the case.

3. The battery module according to claim 1, wherein
voltage detection lines connected to each of the bus bars are connected to the connector.

4. The battery module according to claim 1, wherein
the sensor device further includes another connector for connecting voltage detection lines connected to each of bus bars of another battery module disposed adjacent to one side in the width direction, and a connection portion of the another connector is provided on the one side in the width direction.

\* \* \* \* \*